US012770172B2

(12) United States Patent
Rajan et al.

(10) Patent No.: US 12,770,172 B2
(45) Date of Patent: Oct. 20, 2026

(54) SYSTEMS AND METHODS FOR AUTOMATED TRAINING DATA GENERATION FOR ITEM ATTRIBUTES

(71) Applicant: Walmart Apollo, LLC, Bentonville, AR (US)

(72) Inventors: Adithya Rajan, Edison, NJ (US); Prateek Verma, Seattle, WA (US); Yilei Zhan, Jersey City, NJ (US); Nidhin Tom Pattaniyil, Philadelphia, PA (US); Zheng Yan, Short Hills, NJ (US)

(73) Assignee: Walmart Apollo, LLC, Bentonville, AR (US)

( * ) Notice: Subject to any disclaimer, the term of this patent is extended or adjusted under 35 U.S.C. 154(b) by 710 days.

(21) Appl. No.: 17/516,089

(22) Filed: Nov. 1, 2021

(65) Prior Publication Data

US 2023/0135327 A1 May 4, 2023

(51) Int. Cl.

| | |
|---|---|
| ***G06F 16/00*** | (2019.01) |
| ***G06F 16/2457*** | (2019.01) |
| ***G06F 16/907*** | (2019.01) |
| ***G06N 20/20*** | (2019.01) |
| ***G06Q 30/0201*** | (2023.01) |
| ***G06Q 30/0204*** | (2023.01) |
| ***G06Q 30/0601*** | (2023.01) |

(52) U.S. Cl.

CPC ... *G06Q 30/0627* (2013.01); *G06F 16/24575* (2019.01); *G06F 16/907* (2019.01); *G06N 20/20* (2019.01); *G06Q 30/0201* (2013.01); *G06Q 30/0204* (2013.01); *G06Q 30/0603* (2013.01)

(58) Field of Classification Search

CPC ........... G06Q 30/0627; G06Q 30/0201; G06Q 30/0204; G06Q 30/0603; G06Q 30/0625; G06Q 30/0631; G06Q 30/0633; G06F 16/24575; G06F 16/907; G06F 18/214; G06N 20/20; G06N 20/00

USPC .................................................. 707/600–899

See application file for complete search history.

(56) References Cited

U.S. PATENT DOCUMENTS

| | | | | |
|---|---|---|---|---|
| 11,514,321 | B1 * | 11/2022 | Chen | G06N 20/00 |
| 2020/0311599 | A1 * | 10/2020 | Chen | G06F 16/215 |
| 2020/0342320 | A1 | 10/2020 | Natesh | |
| 2021/0035159 | A1 * | 2/2021 | Zhou | H04N 21/25883 |

(Continued)

FOREIGN PATENT DOCUMENTS

| | | |
|---|---|---|
| CN | 111582895 A | 8/2020 |

*Primary Examiner* — Charles Rones
*Assistant Examiner* — Shirley D Hicks
(74) *Attorney, Agent, or Firm* — Morgan, Lewis & Bockius LLP; Manita Rawat

(57) ABSTRACT

A data generation system can include a computing device that is configured to receive a request to generate a training dataset for an attribute and identify a set of item identifiers from an item database based on an engagement indication. The computing device is further configured to, for each item identifier of the set of item identifiers, obtain a query list including queries resulting in an engagement between the corresponding item identifier and a user and, in response to a portion of queries of the query list including the attribute being above a threshold, assign the corresponding item identifier to the training dataset for the attribute. The computing device is also configured to store the training dataset for the attribute in a training dataset database.

20 Claims, 6 Drawing Sheets

(56) References Cited

U.S. PATENT DOCUMENTS

2021/0240722 A1* 8/2021 Puthenputhussery ........................ G06F 16/24578
2021/0241350 A1 8/2021 Mane et al.
2023/0049418 A1* 2/2023 Saha ..................... G06F 16/285

* cited by examiner

FIG. 3
300
304
308
Pullover Hoodie Fleece Top
Price: $25.99 - $26.99
Clothing Size: Choose an option
XS
S
M
L
XL
2XL

SYSTEMS AND METHODS FOR AUTOMATED TRAINING DATA GENERATION FOR ITEM ATTRIBUTES

TECHNICAL FIELD

The disclosure relates generally to systems and methods for automatically generating training data for database storage and more particularly to identifying and tagging items with attributes based on user queries.

BACKGROUND

To assign or tag particular items with appropriate attributes, training data is used to teach models which items have particular attributes. Appropriately assigning attributes to items improves user experience with, for example, ecommerce marketplaces by improving the prevision of searches within the ecommerce market place.

Due to the size of item catalogs, which can be approximately 40 million items, it is infeasible to manually tag all the items with all appropriate or relevant attributes. That is, manual or crowd-based tagging of training data is often expensive and time consuming. Therefore, there is a need to tag items with appropriate attributes in an automated way to improve the existence of appropriate attribute tags across all items within a catalog.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The embodiments described herein are directed to a data generation system and related methods. The data generation system can include a computing device that is configured to receive a request to generate a training dataset for an attribute and identify a set of item identifiers from an item database based on an engagement indication. The computing device is further configured to, for each item identifier of the set of item identifiers, obtain a query list including queries resulting in an engagement between the corresponding item identifier and a user and, in response to a portion of queries of the query list including the attribute being above a threshold, assign the corresponding item identifier to the training dataset for the attribute. The computing device is also configured to store the training dataset for the attribute in a training dataset database.

In another aspect, the computing device is configured to identify the set of item identifiers from the item database based on the engagement indication by selecting item identifiers from the item database including a corresponding order frequency above an order threshold.

In another aspect, the computing device is configured to identify the set of item identifiers from the item database based on the engagement indication by: determining an engagement value based on at least one of a number of orders, a number of add-to-cart selections, and a number of view selections and selecting a predetermined number of item identifiers corresponding to highest engagement values.

In another aspect, the computing device is configured to identify the set of item identifiers from the item database based on the engagement indication by: determining an engagement value based on at least one of a number of orders, a number of add-to-cart selections, and a number of view selections and selecting the set of item identifiers as item identifiers with a corresponding engagement value above a first engagement threshold.

In another aspect, obtaining the query list includes identifying a subset of queries of the query list including a number of engagements between the corresponding item identifier and a user being above a second engagement threshold.

In another aspect, the attribute includes at least one of: (i) a gender, (ii) an age, and (iii) a color.

In another aspect, the computing device is configured to receive a generate request to generate a machine learning model to classify item identifiers as including the attribute, obtain the training dataset for the attribute from the training dataset database, generate the machine learning model using the training dataset for the attribute, and store the machine learning model in a model database.

In another aspect, the computing device is configured to, in response to receiving a new item identifier, determine at least one attribute of the new item identifier by applying a plurality of machine learning models stored in the model database to the new item identifier and identify and tag the new item identifier based on the at least one attribute.

In various embodiments of the present disclosure, a method of data generation is provided. In some embodiments, the method can include receiving a request to generate a training dataset for an attribute and identifying a set of item identifiers from an item database based on an engagement indication. The method can also include, for each item identifier of the set of item identifiers, obtaining a query list including queries resulting in an engagement between the corresponding item identifier and a user and, in response to a portion of queries of the query list including the attribute being above a threshold, assigning the corresponding item identifier to the training dataset for the attribute. The method can also include storing the training dataset for the attribute in a training dataset database.

In various embodiments of the present disclosure, a non-transitory computer readable medium is provided. The non-transitory computer readable medium can have instructions stored thereon, wherein the instructions, when executed by at least one processor, cause a device to perform operations that include receiving a request to generate a training dataset for an attribute and identifying a set of item identifiers from an item database based on an engagement indication. The operations can also include, for each item identifier of the set of item identifiers, obtaining a query list including queries resulting in an engagement between the corresponding item identifier and a user and, in response to a portion of queries of the query list including the attribute being above a threshold, assigning the corresponding item identifier to the training dataset for the attribute. The operations can also include storing the training dataset for the attribute in a training dataset database.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The features and advantages of the present disclosures will be more fully disclosed in, or rendered obvious by, the following detailed descriptions of example embodiments.

The detailed descriptions of the example embodiments are to be considered together with the accompanying drawings wherein like numbers refer to like parts and further wherein.

In the drawings, reference numbers may be reused to identify similar and/or identical elements.

DETAILED DESCRIPTION

Figure 1:
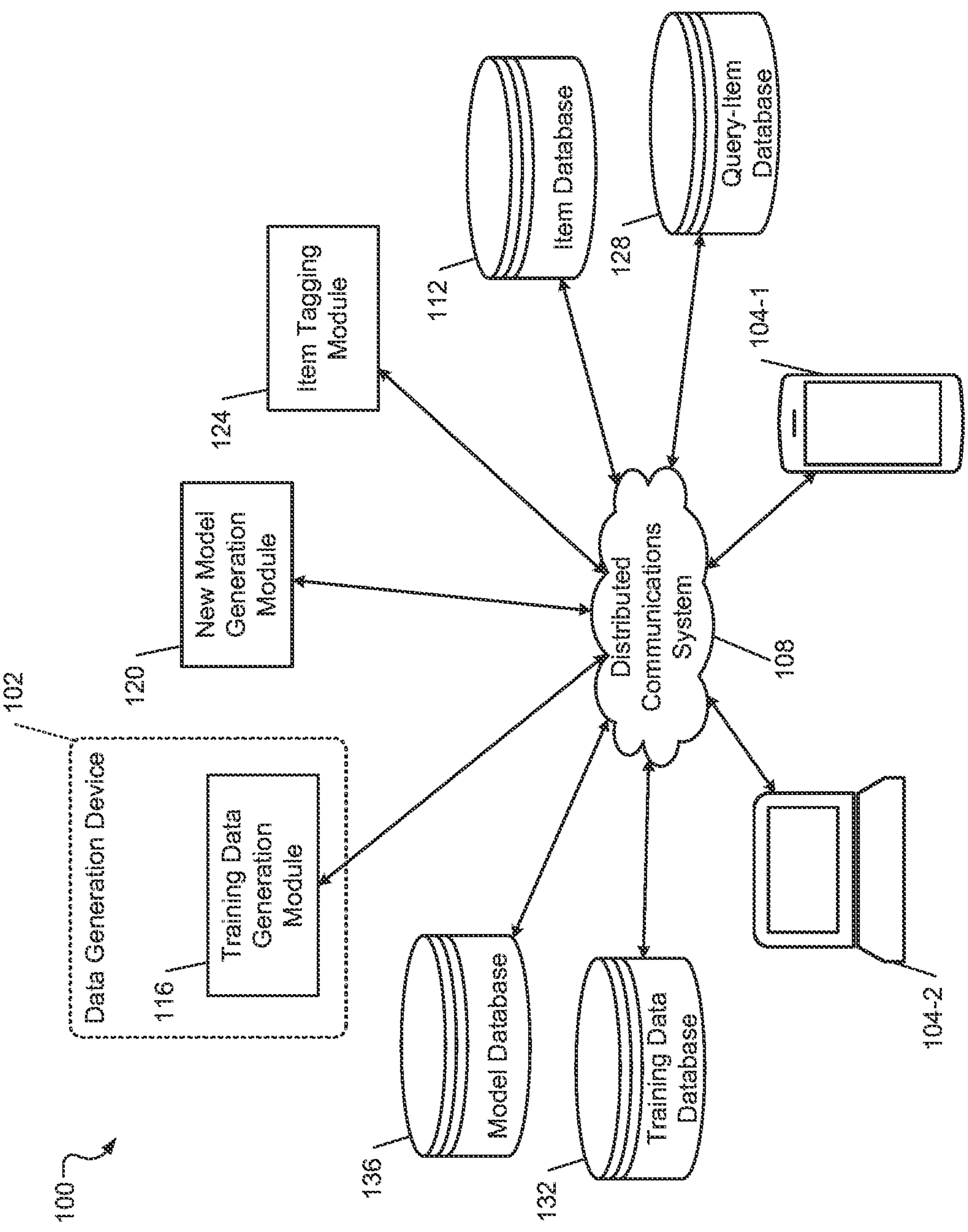
FIG. 1 is a block diagram of a data generation system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "connected," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

A data generation system may be implemented to generate a training dataset for a plurality of different attributes. As noted above, generating training datasets is an important and necessary step to create machine learning models to identify and tag corresponding attributes found in items. For example, the training dataset may be created from a subset of a plurality of items being sold on an online platform, such as an ecommerce website or marketplace operated by an entity. The ecommerce marketplace may display a variety of items for sale, including clothing items, food items, appliances, etc. These items may be received directly from particular merchants and include a short description, a long description, and also a textbox where the merchant can type in specific descriptions. Often times, the merchant may lean towards "overselling" or "overmarketing" an item in the descriptions by trying to avoid limiting the customers who will view the item as a result of a search, for example, by not labeling the particular item according to an age group, selecting a gender of the item, etc.

However, these attributes are useful to improve search results provided to customers who are searching for particular items. To improve attribute tagging of items listed on the ecommerce marketplace, the data generation system generates training datasets for the plurality of attributes (gender, age, color, etc.), which are used to generate machine learning models to properly tag items listed on the ecommerce marketplace to improve returned search results. That is, for each attribute of the plurality of attributes, a machine learning model is built to classify new and existing items on the ecommerce marketplace into corresponding attributes and assign those attributes to the corresponding items.

Instead of manually labeling new and existing items, which requires excessive amounts of an individual's time and is subjective based on the individual as well as the labels/attributes that are created, the data generation system automates the process of identifying attributes of items and tagging those items accordingly. The data generation system identifies which items are most engaged with by customers. From those highly engaged items, the data generation system identifies a set of queries for each item that resulted in high customer engagement. That is, the data generation system uses customer submitted search queries to identify whether a particular item belongs to a particular attribute. More specifically, the data generation system identifies which queries are related to items, for example, by determining which items were interacted with by a customer after the customer entered a query.

Then, if more than a threshold number of queries include a particular attribute, for example, for gender, if more than 90% of the queries include the word "man," "men," "boy," or another word indicating male, then the data generation system tags the item as gendered male and includes the item in the training dataset. Otherwise, if not enough queries include the particular attribute, the item is not tagged and is not included in the training dataset. The training dataset may be used to generate a machine learning model that can then tag new or existing items with the particular attribute, here, the male gender.

The data generation system develops a framework to generate labels for training data through an automated process using past user engagement data. This reduces the bottleneck of manually labelling training data and is also capable of generating context driven labels for cases where the text fields of an item are imprecise, incomplete, and/or confusing.

Referring to FIG. 1, a block diagram of a data generation system 100 is shown. The data generation system 100 may include a data generation device 102 and user devices 104-1 and 104-2, collectively user device 104, such as a phone, tablet, laptop, mobile computing device, desktop, etc., capable of communicating with a plurality of databases and modules via a distributed communications system 108. The user device 104 may operate an ecommerce marketplace via a web browser or an application for customers to view items for sale by the ecommerce marketplace that are stored in an item database 112. For example, a customer may submit a query through a graphical user interface of the user device 104 on the ecommerce marketplace through a web browser or application, which retrieves a subset of items from the item database 112 that pertain to the query and displays the subset of items to the customer via the graphical user interface of the user device 104.

The data generation system 100 also includes a training data generation module 116, a new model generation module 120, and an item tagging module 124. The data generation system 100 also includes a query-item database 128, a training data database 132, and a model database 136. The training data generation module 116 can identify, from items stored in the item database 112, which items may be included in training datasets for particular attributes. Based on the training dataset, the new model generation module 120 can create a machine learning model, such as a standard machine learning model classifier that classifies new and existing items, updates the attributes pertaining to the new and existing items, and stores the generated machine learning model in the model database 136. The item tagging module 124 can implement the machine learning models for the plurality of attributes and tag or classify the item according to the identified attributes in the item database 112. Then, when a customer submits a query including an attribute that was added to a particular item, that item may be displayed to the customer since it has been properly labelled.

The data generation device 102 and the user device 104 can be any suitable computing device that includes any hardware or hardware and software combination for processing and handling information. For example, the term "device" and/or "module" can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, the distributed communications system 108. In various implementations, the devices, modules, and databases may communicate directly on an internal network.

As indicated above, the data generation device 102 and/or the user device 104 can be a computer, a workstation, a laptop, a server such as a cloud-based server, or any other suitable device. In some examples, data generation device 102 and/or the user device 104 can be a cellular phone, a smart phone, a tablet, a personal assistant device, a voice assistant device, a digital assistant, a laptop, a computer, or any other suitable device. In various implementations, the data generation device 102 is on a central computing system that is operated and/or controlled by a retailer. Additionally or alternatively, the modules and databases of the data generation device 102 are distributed among one or more workstations or servers that are coupled together over the distributed communications system 108.

The databases described can be remote storage devices, such as a cloud-based server, a memory device on another application server, a networked computer, or any other suitable remote storage. Further, in some examples, the databases can be a local storage device, such as a hard drive, a non-volatile memory, or a USB stick.

The distributed communications system 108 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The distributed communications system 108 can provide access to, for example, the Internet.

Figure 2:
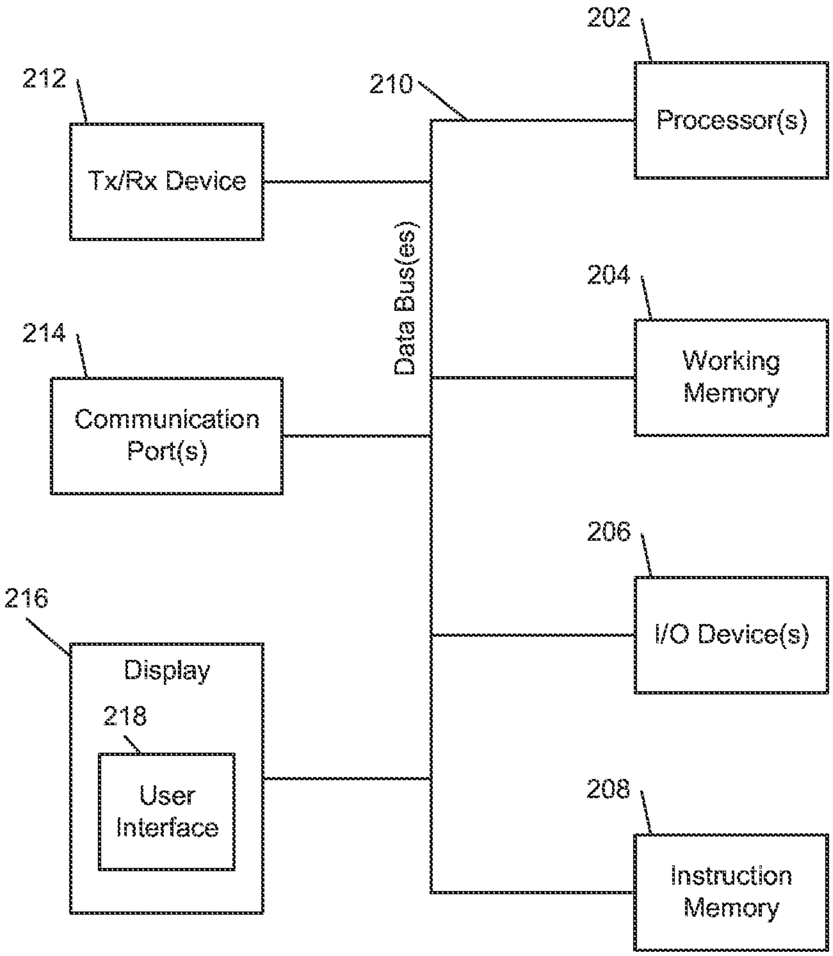
FIG. 2 is a block diagram of a computing device implementing the data generation device of FIG. 1 in accordance with some embodiments.

FIG. 2 illustrates an example computing device 200. The data generation device 102 and/or the user device 104 may include the features shown in FIG. 2. For the sake of brevity, FIG. 2 is described relative to the data generation device 102.

As shown, the data generation device 102 can be a computing device 200 that may include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of the data generation device 102. Working memory 204 can be a random access memory (RAM) such as a static random access memory (SRAM) or dynamic random access memory (DRAM), or any other suitable memory.

Input-output devices 206 can include any suitable device that allows for data input or output. For example, input-output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as data items including feedback information.

Display 216 can display a user interface 218. User interfaces 218 can enable user interaction with the data generation device 102. For example, user interface 218 can be a user interface that allows an operator to interact, communicate, control and/or modify different features or parameters of the data generation device 102. The user interface 218 can, for example, display the items for sale for a user or customer view as a result of searching or browsing on an ecommerce marketplace. In some examples, display 216 can be a touchscreen, where user interface 218 is displayed on the touchscreen.

Transceiver 212 allows for communication with a network, such as the distributed communications system 108 of FIG. 1. For example, if the distributed communications system 108 of FIG. 1 is a cellular network, transceiver 212 is configured to allow communications with the cellular network. In some examples, transceiver 212 is selected based on the type of distributed communications system 108 in which the data generation device 102 will be operating. Processor(s) 202 is operable to receive data from, or send data to, a network, such as the distributed communications system 108 of FIG. 1, via transceiver 212.

Figure 3:
FIG. 3 is a graphical user interface depicting an example item for display on an ecommerce marketplace in accordance with some embodiments.

Referring to FIG. 3, a graphical user interface depicting an example item 300 for display on an ecommerce marketplace is shown. The example item 300, a hoodie, is shown how the item would be displayed on a user device after the customer selected the item to view. A picture 304 of the item is shown as well as a title 308, here the title 308 of the item is "Pullover Hoodie Fleece Top," which excludes any gender, age, color, etc. The customer can also select a size. Since the example item 300 excludes certain attributes in the name, the example item 300 may not be returned to the customer when inputting a query including certain attributes, such as gender. The data generation system 100 provides a method to generate training data corresponding to particular attributes to properly label items, such as example item 300, with additional descriptors so the item may be returned to a customer when queries include certain attributes in the future and may be used as training data to generate the models.

Figure 4:
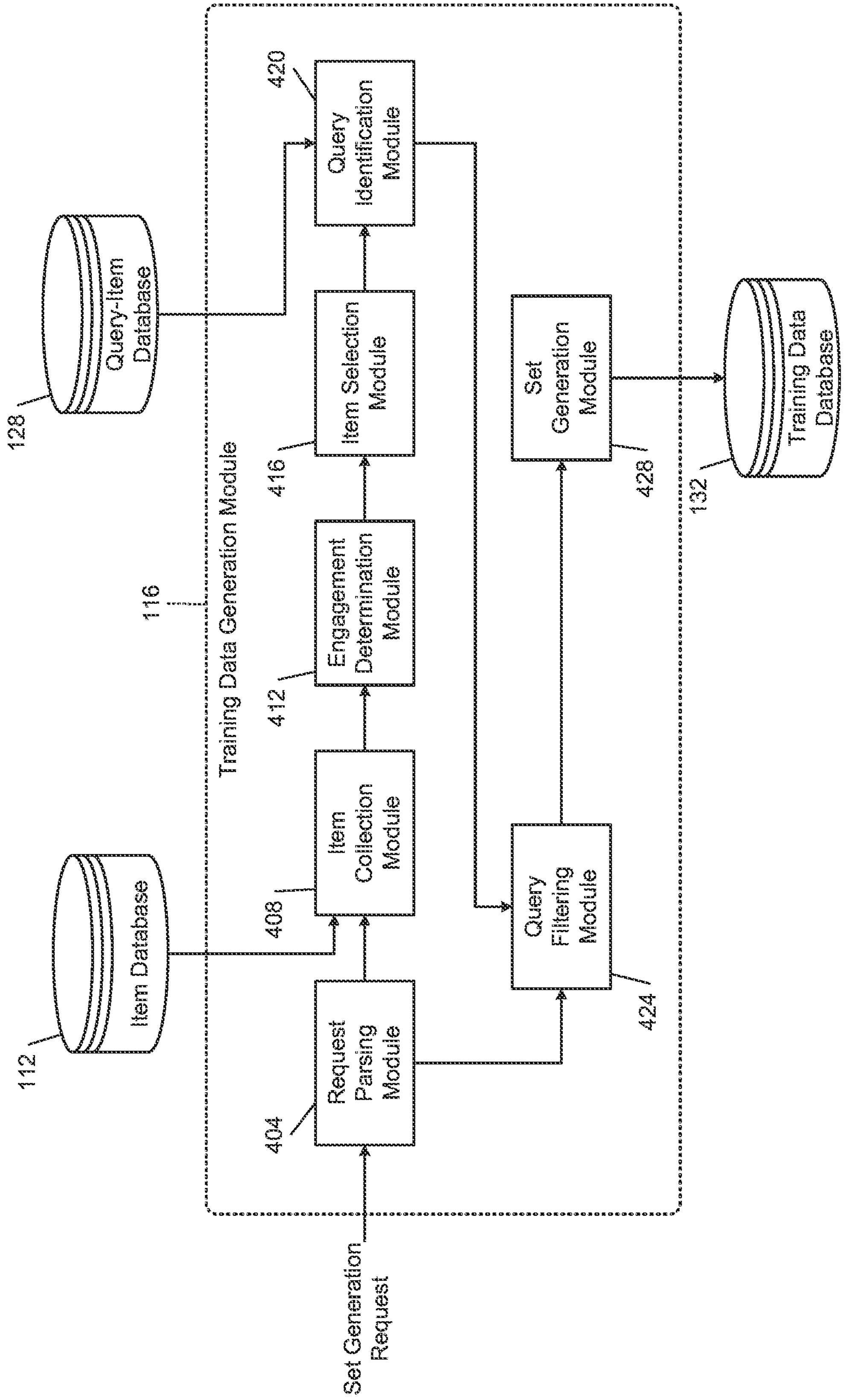
FIG. 4 is a block diagram illustrating an example training data generation module of the data generation system of FIG. 1 in accordance with some embodiments.

Referring now to FIG. 4, a block diagram illustrating an example training data generation module 116 of the data generation system 100 of FIG. 1 is shown. The training data generation module 116 includes a request parsing module 404 that receives a set generation request. The set generation request may be sent by an analyst associated with the entity operating the ecommerce marketplace using a computing device (such as user device 104). The set generation request is sent to generate training data for particular attributes, such as gender (male, female, unisex), age (infant, teen, adult), etc. Training datasets may be generated at predetermined intervals, such as monthly, quarterly, etc., or on an as needed basis. The set generation request may include a particular attribute as well as a specific subset of that attribute, for example, the set generation request could indicate a request for training data for gender, specifically, female gender.

The request is forwarded to an item collection module 408, which selects item identifiers corresponding to items stored in the item database 112, along with corresponding parameters including a total number of orders, a total number of add to cart selections, and a total number of views of the item. In various implementations, the item collection module 408 may select a subset of item identifiers, for example, the item collection module 408 may select item identifiers that have at least a total number of orders greater than a threshold value, for example, those item identifiers with at least a total number of two orders.

An engagement determination module 412 receives the item identifiers and determines an engagement value for each of the item identifiers. The engagement value may be calculated as the sum of the parameters for an item, that is, the sum of the total number of orders, the total number of add to cart selections, and the total number of item views. In various implementations, the above parameters, or interaction information, may be first weighted. For example, the total number of orders may be multiplied by 50, the total number of add to cart selections may be multiplied by 10, and the total number of item views may be multiplied by 5, and the sum of those weighted interactions is the engagement value for the corresponding item. In various implementations, if all item identifiers are selected, all those item identifiers with fewer than two orders are automatically assigned an engagement value of zero.

The engagement determination module 412 forwards the item identifiers and the engagement values to an item selection module 416. The item selection module 416 selects a set number of item identifiers that correspond to the highest engagement values. For example, the item selection module 416 may select 500 item identifiers with the highest engagement scores. In various implementations, the item selection module 416 may select all item identifiers above a threshold value.

The selected item identifiers are forwarded to a query identification module 420. The query identification module 420 retrieves a set of queries from the query-item database 128 for each item identifier. The retrieved set of queries includes queries that results in a customer engaging or interacting with the corresponding item as a result of submitting the query to search the ecommerce marketplace. The retrieved queries are forwarded to a query filtering module 424, which also receives the attribute included in the request.

The query filtering module 424 determines if, for each item identifier, none of the retrieved set of queries includes the attribute. For example, for a first item identifier, if none of the retrieved set of queries includes the attribute "female" (or other words indicating female), then the item identifier is removed and is no longer being considered to be added to the training dataset for female. The filtered item identifiers are forwarded to a set generation module 428.

The set generation module 428 determines whether, for each item identifier, a threshold percentage of the total number of queries includes the attribute. For example, if, for a second item identifier, greater than 90% of the retrieved set of queries includes the term "female," then the second item identifier should be included in the training dataset because the corresponding second item can confidently be classified as "female." Otherwise, if less than 90% of the retrieved set of queries include the term "female," then the second item cannot be used as training data for the female attribute. If the percentage of retrieved set of queries for an item identifier is above the threshold percentage, the set generation module 428 forwards the item identifier to the training data database 132 to be stored in a dataset for the attribute indicated in the set generation request.

Figure 5:
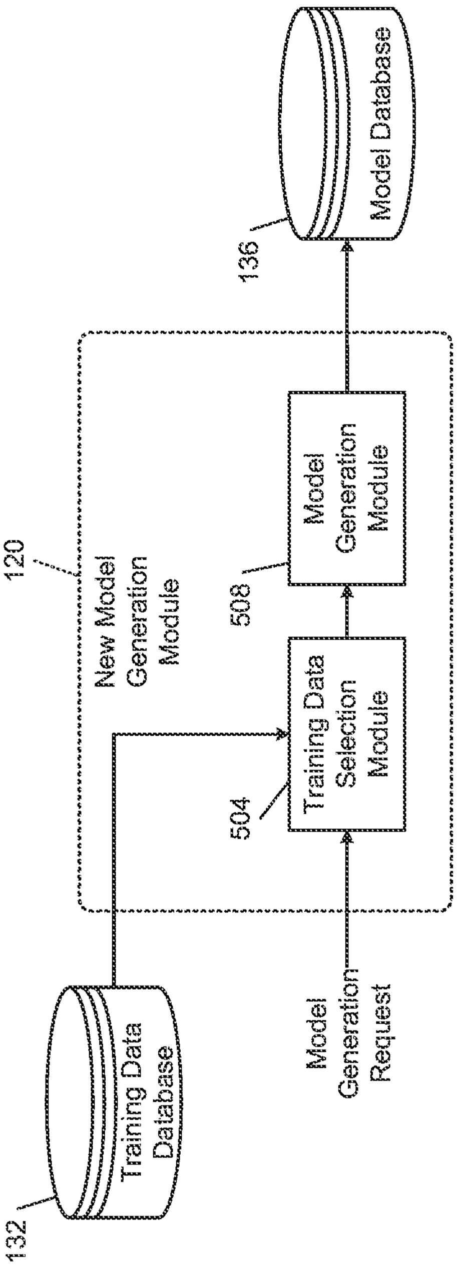
FIG. 5 is a block diagram illustrating an example new model generation module of the data generation system of FIG. 1 in accordance with some embodiments.

Referring now to FIG. 5, a block diagram illustrating an example new model generation module 120 of the data generation system 100 of FIG. 1 is shown. The new model generation module 120 includes a training data selection module 504, which receives a model generation request. In various implementations, the model generation request may be sent by an analyst associated with the entity operating the ecommerce marketplace. The various machine learning models corresponding to attributes may be updated at set intervals, for example, monthly, or may be updated on an as needed basis, for example, if a new attribute is created entirely or a new attribute within a particular category is created.

The training data selection module 504 obtains, from the training data database 132, a training dataset that corresponds to an attribute indicated in the model generation request. The training data selection module 504 forwards the training dataset to a model generation module 508 to create a machine learning model for the indicated attribute using the corresponding training dataset. The machine learning models for each attribute are trained to classify new or existing items of the ecommerce marketplace as belonging to the particular attribute or not. In various implementations, a model is generated for each attribute, a single model for each umbrella attribute (gender, age, etc.), or a single model including all of the attributes. The model generation module 508 is stored in the model database 136.

Figure 6:
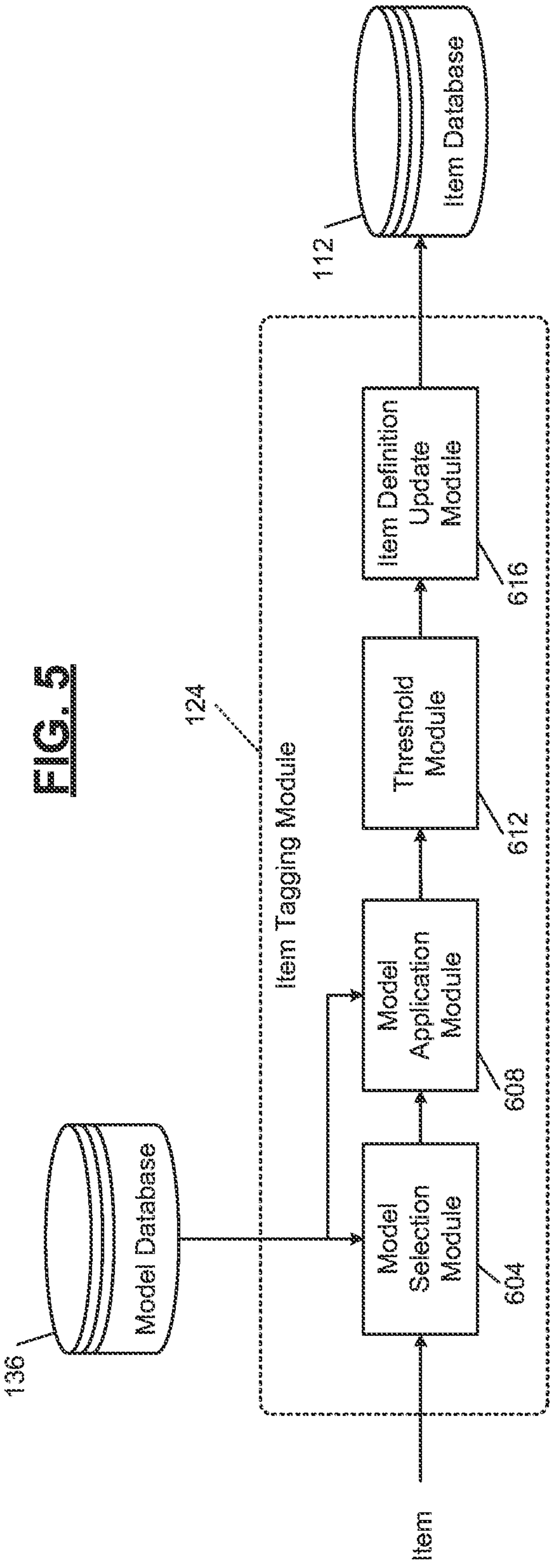
FIG. 6 is a block diagram illustrating an example item tagging module of the data generation system of FIG. 1 in accordance with some embodiments.

Referring now to FIG. 6, a block diagram illustrating an example item tagging module 124 of the data generation system 100 of FIG. 1 is shown. The item tagging module 124 includes a model selection module 604 that receives an item that needs to be classified. The item may be a new item or an existing item. The model selection module 604 determines which models to apply to the item. For example, if the item is a food item, the gender models do not need to be applied to the food item. Therefore, the model selection module 604 determines which models to apply to the item based on the type of item. In various implementations, if the item is already labeled with an attribute corresponding to one of the models of the model database 136, the model selection module 604 accepts the existing label. For example, if the item is already labeled as "female" by the merchant, the model selection module 604 does not select any model from the model database 136 that is related to gender. However, if the item is labelled as unisex, the model selection module 604 may select models related to gender to ensure the unisex label is proper.

The selected models are forwarded to a model application module 608 that selects the selected models from the model database 136 to apply the models to the item. In various implementations, the models output a classification or similarity score indicating how related the item is to a particular attribute. For example, the score may be between 0 and 1. The score is forwarded to a threshold module 612 for each attribute. The threshold module 612 compares the score to an attribute threshold. That is, each attribute may have a different threshold based on the type of attribute. For example, to classify as male or female, the score may have to be above 0.75 with the score for the opposite gender being below a certain threshold. For example, to be classified as female, the model score for female is above 0.75 and the score for unisex and/or male is less than 0.2. The classifications are forwarded from the threshold module 612 to an item definition update module 616. The item definition update module 616 updates the corresponding item definition to include the attributes to which the item was classified by the machine learning models. The updated item definition is stored in the item database 112, which contains data about each item that customers can search on the ecommerce marketplace.

Figure 7:
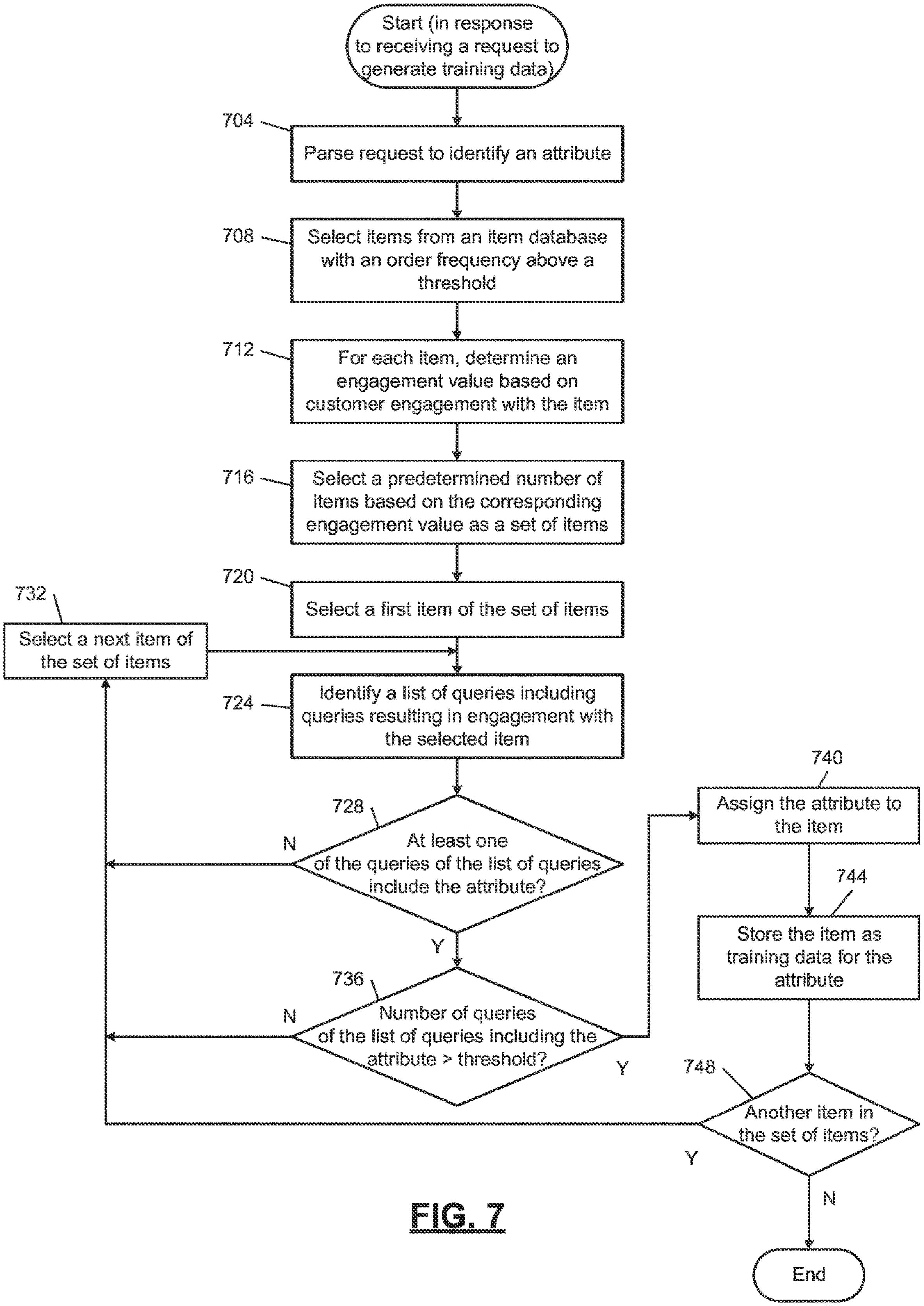
FIG. 7 is a flowchart of example methods of generation of a training dataset for an attribute in accordance with some embodiments.

Referring now to FIG. 7, a flowchart of example methods of generation of a training dataset for an attribute is shown. Control begins in response to receiving a request to generate training data. Control continues to 704 to parse the request to identify an attribute indication in the request. Control continues to 708 to select items from an item database with an order frequency (or a total number of orders) above a threshold number, for example, two. That is, control only includes items in training data if the item has been purchased at least twice. Control continues to 712 to, for each item, determine an engagement value based on customer engagement with the item. As described above, the total number of orders, the total number of add to cart selections, and total number of item views are weighted by multiplying the numbers by 50, 10, and 5, respectively, and then summed to determine the engagement value of the item.

Control proceeds to 716 to select a predetermined number of items based on the corresponding engagement value as the set of items. That is, control selects the top, for example, 500 items based on the corresponding engagement value. In various implementations, control may select those items above a particular threshold engagement value. Control continues to 720 to select a first item of the set of items. Control proceeds to 724 to identify a list of queries including queries resulting in engagement with the selected item. That is, control selects the list of queries based on which queries were entered and, as a result, the selected item was viewed, added to the customer's cart, and/or ordered. Control continues to 728 to determine if at least one of the queries in the list of queries includes the attribute, indicating the item may be associated with the attribute. If no, control proceeds to 732 to select a next item of the set of items and returns to 724.

Otherwise, control continues to 736 to determine if the number of queries of the list of queries including the attribute is greater than a threshold. That is, control determines if the number of queries within the list of queries that include the attribute are greater than the threshold. For example, the threshold may be a percentage such as 90%. Therefore, at least 90% of the queries of the list of queries need to include the attribute, otherwise control returns to 732. If the number of queries of the list of queries including the attribute is above the threshold, control proceeds to 740 to assign the attribute to the item. Then, control proceeds to 744 to store the item as training data for the attribute. Control continues to 748 to determine if another item is in the set of items. If yes, control returns to 732. Otherwise, control ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made of up of levels of trainable filters, transformations, projections, hashing, pooling and regularization. The models may be used in large-scale relationship-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:

a processor; and a non-transitory memory storing instructions that, when executed, cause the processor to:

receive a request to generate a training dataset for an attribute defining one or more features of an item in a first plurality of items, wherein the attribute and an attribute threshold value are defined, at least in part, by the request;

determine a similarity score for each item identifier, in a plurality of item identifiers, associated with a corresponding plurality of items, different from the first plurality of items, stored in an item database based on one or more queries, each respective query in the one or more queries is (i) associated, at least in part, with one or more corresponding interactions with a respective item, in a first subset of a plurality of items, displayed at a corresponding computing device and (ii) received, at least in part, as one or more words defining the attribute and inputted at a graphical user interface of the corresponding computing device, in a plurality of computing devices;

select a first set of item identifiers, in the plurality of item identifiers, from the item database based on the similarity score, wherein the similarity score indicates how related a corresponding item identifier is to the attribute;

generate the training dataset for the attribute by:

for each item identifier of the first set of item identifiers:

compare the similarity score to the attribute threshold value; and in response to the similarity score being above the attribute threshold value, include the corresponding item identifier in the training dataset for the attribute;

store the training dataset for the attribute in a training dataset database different from the item database;

generate a trained machine learning model using the training dataset for the attribute applied to a machine learning model;

store the trained machine learning model in a model database different from the item database and the training dataset database;

receive a request to display a first item, different from the first plurality of items and the corresponding plurality of items, via a corresponding graphical user interface of a respective computing device in the plurality of computing devices, the request comprising a second set of item identifiers, different from the first set of item identifiers, associated with the first item; and use the trained machine learning model to perform a process comprising:

select a subsequent set of item identifiers, in the plurality of item identifiers, from the item database based on the first item and a subsequent similarity score generated by the trained machine learning model using the second set of item identifiers, wherein the subsequent similarity score comprises a value defining a relation between an item identifier in the subsequent set of item identifiers is to the attribute;

receive an updated attribute threshold value;

for each item identifier of the subsequent set of item identifiers:

compare the similarity score to the updated attribute threshold value; and in response to the similarity score being above the attribute threshold value, assign the corresponding item identifier to an updated training dataset for the attribute;

store (i) the updated training dataset for the attribute in the training dataset database and (ii) the corresponding item identifier associated with the first item in the item database; and generate, responsive to receiving an input comprising a first set of words, different from the one or more words, defining the attribute and inputted at a graphical user interface of a first computing device, one or more instructions causing display at the first computing device of at least the first item.

2. The system of claim 1, wherein the instructions further cause the processor to:

identify the set of item identifiers from the item database based on the similarity score by selecting item identifiers from the item database including a corresponding order frequency above an order threshold.

3. The system of claim 1, wherein the instructions further cause the processor to:

identify the set of item identifiers from the item database based on the similarity score by:

determining an engagement value based on at least one of a number of orders, a number of add-to-cart selections, and a number of view selections; and selecting a predetermined number of item identifiers corresponding to highest engagement values.

4. The system of claim 1, wherein the instructions further cause the processor to:

identify the set of item identifiers from the item database based on the similarity score by:

determining an engagement value based on at least one of a number of orders, a number of add-to-cart selections, and a number of view selections; and selecting the set of item identifiers as item identifiers with a corresponding engagement value above a first engagement threshold.

5. The system of claim 1, wherein comparing the similarity score to the attribute threshold value includes identifying a subset of queries of a query list including a number of engagements between the corresponding item identifier and a user being above a second engagement threshold.

6. The system of claim 1, wherein the attribute includes at least one of: (i) a gender, (ii) an age, and (iii) a color.

7. The system of claim 1, wherein the instructions further cause the processor to:

classify item identifiers as including the attribute using the trained machine learning model.

8. The system of claim 1, wherein the instructions further cause the processor to, in response to receiving a new item identifier:

determine at least one attribute of the new item identifier by applying a plurality of machine learning models, comprising the trained machine learning model, stored in the model database to the new item identifier; and identify and tag the new item identifier based on the at least one attribute.

9. A method comprising:

receiving a request to generate a training dataset for an attribute defining one or more features of an item in a first plurality of items, wherein the attribute and an attribute threshold value are defined, at least in part, by the request;

determining a similarity score for each item identifier, in a plurality of item identifiers, associated with a corresponding plurality of items, different from the first plurality of items, stored in an item database based on one or more queries, each respective query in the one or more queries is (i) associated, at least in part, with one or more corresponding interactions with a respective item, in a first subset of a plurality of items, displayed at a corresponding computing device and (ii) received, at least in part, as one or more words defining the attribute and inputted at a graphical user interface of the corresponding computing device, in a plurality of computing devices;

selecting a first set of item identifiers, in the plurality of item identifiers, from the item database based on the similarity score, wherein the similarity score indicates how related a corresponding item identifier is to the attribute;

generating the training dataset for the attribute by:

for each item identifier of the first set of item identifiers:

comparing the similarity score to the attribute threshold value; and in response to the similarity score being above the attribute threshold value, including the corresponding item identifier in the training dataset for the attribute;

storing the training dataset for the attribute in a training dataset database different from the item database;

generating a trained machine learning model using the training dataset for the attribute applied to a machine learning model;

storing the trained machine learning model in a model database different from the item database and the training dataset database;

receiving a request to display a first item, different from the first plurality of items and the corresponding plurality of items, via a corresponding graphical user interface of a respective computing device in the plurality of computing devices, the request comprising a second set of item identifiers, different from the first set of item identifiers, associated with the first item; and using the trained machine learning model to perform a process comprising:

selecting a subsequent set of item identifiers, in the plurality of item identifiers, from the item database based on the first item and a subsequent similarity score generated by the trained machine learning model using the second set of item identifiers, wherein the subsequent similarity score comprises a value defining a relation between an item identifier in the subsequent set of item identifiers is to the attribute;

receiving an updated attribute threshold value;

for each item identifier of the subsequent set of item identifiers:

comparing the similarity score to the updated attribute threshold value; and in response to the similarity score being above the attribute threshold value, assign the corresponding item identifier to an updated training dataset for the attribute;

storing (i) the updated training dataset for the attribute in the training dataset database and (ii) the corresponding item identifier associated with the first item in the item database; and generating, responsive to receiving an input comprising a first set of words, different from the one or more words, defining the attribute and inputted at a graphical user interface of a first computing device, one or more instructions causing display at the first computing device of at least the first item.

10. A non-transitory computer readable medium having instructions stored thereon, wherein the instructions, when executed by at least one processor, cause a device to perform operations comprising:

receiving a request to generate a training dataset for an attribute defining one or more features of an item in a first plurality of items, wherein the attribute and an attribute threshold value are defined, at least in part, by the request;

determining a similarity score for each item identifier, in a plurality of item identifiers, associated with a corresponding plurality of items, different from the first plurality of items, stored in an item database based on one or more queries, each respective query in the one or more queries is (i) associated, at least in part, with one or more corresponding interactions with a respective item, in a first subset of a plurality of items, displayed at a corresponding computing device and (ii) received, at least in part, as one or more words defining the attribute and inputted at a graphical user interface of the corresponding computing device, in a plurality of computing devices;

selecting a first set of item identifiers, in the plurality of item identifiers, from the item database based on the similarity score, wherein the similarity score indicates how related a corresponding item identifier is to the attribute;

generating the training dataset for the attribute by:

for each item identifier of the first set of item identifiers:

comparing the similarity score to the attribute threshold value; and in response to the similarity score being above the attribute threshold value, including the corresponding item identifier in the training dataset for the attribute;

storing the training dataset for the attribute in a training dataset database different from the item database;

generating a trained machine learning model using the training dataset for the attribute applied to a machine learning model;

storing the trained machine learning model in a model database different from the item database and the training dataset database;

receiving a request to display a first item, different from the first plurality of items and the corresponding plurality of items, via a corresponding graphical user interface of a respective computing device in the plurality of computing devices, the request comprising a second set of item identifiers, different from the first set of item identifiers, associated with the first item; and using the trained machine learning model to perform a process comprising:

selecting a subsequent set of item identifiers, in the plurality of item identifiers, from the item database based on the first item and a subsequent similarity score generated by the trained machine learning model using the second set of item identifiers, wherein the subsequent similarity score comprises a value defining a relation between an item identifier in the subsequent set of item identifiers is to the attribute;

receiving an updated attribute threshold value;

for each item identifier of the subsequent set of item identifiers:

comparing the similarity score to the updated attribute threshold value; and in response to the similarity score being above the attribute threshold value, assigning the corresponding item identifier to an updated training dataset for the attribute;

storing (i) the updated training dataset for the attribute in the training dataset database and (ii) the corresponding item identifier associated with the first item in the item database; and generating, responsive to receiving an input comprising a first set of words, different from the one or more words, defining the attribute and inputted at a graphical user interface of a first computing device, one or more instructions causing display at the first computing device of at least the first item.

11. The system of claim 1, wherein the determining the similarity score is based, at least in part, on a first weight associated with a first type of interaction in the one or more corresponding interactions and a second weight, different from the first weight, associated with a second type of interaction in the one or more corresponding interactions, different from the first type of interaction.

12. The system of claim 1, wherein the determining the similarity score comprises assigning a first value to each respective interaction in the one or more corresponding interactions that satisfies a threshold value and assigning a second value, less than the first value, that fails to satisfy the threshold value.

13. The system of claim 1, wherein the attribute is based, at least in part, on a text description of a first length and a text description of a second length greater than the first length and defined, at least in part, by a third-party.

14. The system of claim 1, wherein the set of items is selected based, at least in part, on a predetermined threshold number of items associated with the set of items.

15. The system of claim 1, wherein the similarity score is bound between a minimum respective similar score and a maximum respective similarity score.

16. The system of claim 1, wherein the one or more corresponding interactions comprises a viewing of a respective item through a graphical user interface, a selection of the respective item through the graphical user interface, a value of the respective item, or a combination thereof.

17. The system of claim 1, wherein, prior to the determining the similarity score comprises, the instructions further cause the processor to identify each item stored in the item database satisfying a threshold value of queries.

18. The system of claim 1, wherein the attribute includes (i) a gender, (ii) an age, (iii) a color, or (iv) a size.

19. The system of claim 1, wherein the training dataset comprises a corresponding item definition for each respective item in the set of item identifiers.

20. The system of claim 1, wherein the updated training dataset is accessible to a plurality of untrained models.

* * * * *